Oct. 20, 1953    A. T. BODLE    2,655,818
POWER TRANSMISSION UNIT
Filed May 8, 1950    2 Sheets-Sheet 1
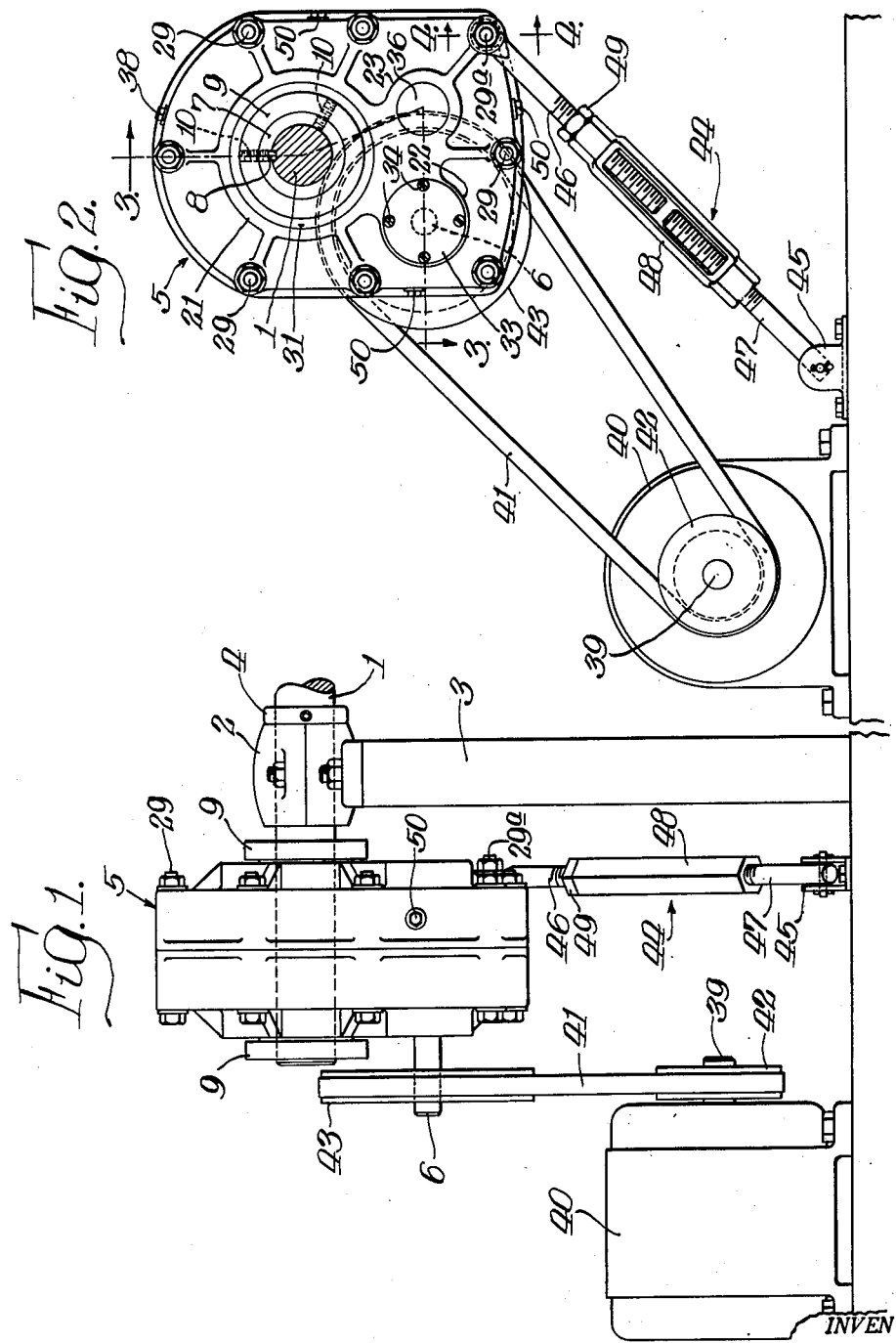
INVENTOR.
Alexander T. Bodle
BY
Osgood H. Dowell
Atty.

Oct. 20, 1953
A. T. BODLE
2,655,818
POWER TRANSMISSION UNIT
Filed May 8, 1950
2 Sheets-Sheet 2
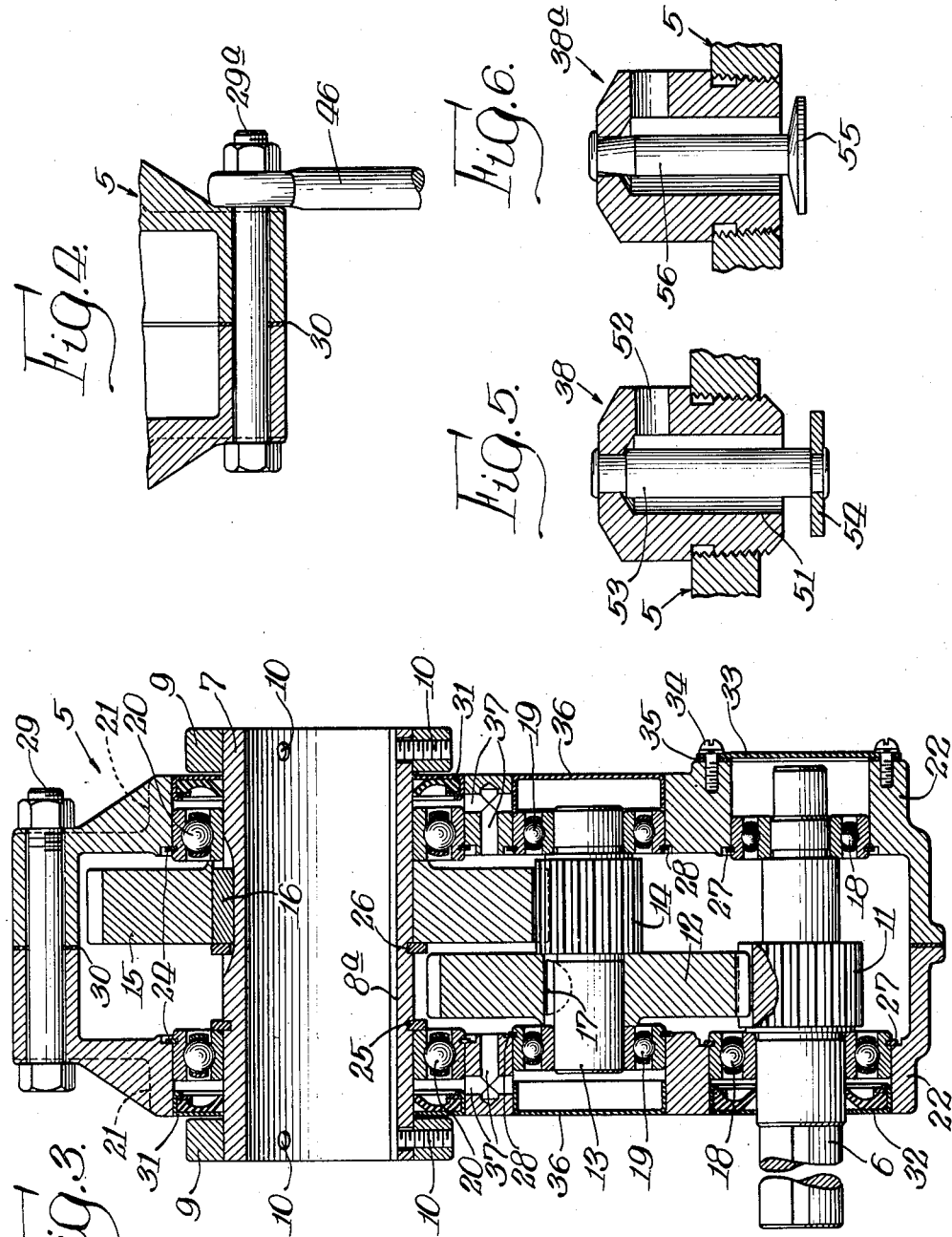
INVENTOR.
Alexander T. Bodle,
BY
Osgood H. Dowell
Atty.

Patented Oct. 20, 1953

2,655,818

UNITED STATES PATENT OFFICE 2,655,818

POWER TRANSMISSION UNIT

Alexander T. Bodle, Mishawaka, Ind., assignor to Dodge Manufacturing Corporation, Mishawaka, Ind., a corporation of Indiana Application May 8, 1950, Serial No. 160,670

6 Claims. (Cl. 74—421)

For driving a machine shaft from a motor, it is desirable to employ a speed-reducing power-transmission unit carried by the shaft to be driven, said unit having its power-intake shaft belt-driven from the motor.

The present invention relates to a speed-reducing transmission unit of the type referred to, and to a shaft-driving organization incorporating a unit of said type with associated equipment hereinafter described.

Objects of the invention are to provide a unit of said type adapted to be applied as an assembled device to the shaft to be driven; to provide a unit of said type of highly practicable and advantageous character and construction; and to provide in connection with the unit practicable means for holding the gear case thereof in a desired angular relation to the shaft to be driven, as may be appropriate for assembly of the unit with the driving belt, said means being easily adjustable after installation for shifting the position of the driven sheave of the belt drive for belt-tightening.

Further objects more or less ancillary or subsidiary to the foregoing will be understood from the following description with reference to the accompanying drawings.

In said drawings:

Fig. 1 is a side elevation of a shaft-driving organization embodying the invention.

Fig. 2 is a rear elevation of such organization, looking from the section line 2—2 of Fig. 1 and showing the shaft to be driven in cross-section.

Fig. 3 is a sectional view of the speed-reducing unit taken on the angled line 3—3 of Fig. 2, looking in the direction of the arrows.

Fig. 4 is a detail section on the line 4—4 of Fig. 2.

Fig. 5 is a detail sectional view of a breather plug.

Fig. 6 is a similar view of an alternative form of breather plug.

In Figs. 1 and 2, a shaft to be driven is designated by the numeral 1. This may be the drive shaft of a machine or machine unit. Said shaft is mounted in fixed bearings one of which is shown as a pillow block bearing 2 mounted on a machine frame member 3. Collars fixed to said shaft, one of which is shown at 4, cooperate with the shaft bearings to hold the shaft against axial displacement.

Removably mounted on a stub extension of the shaft 1 is a transmission unit comprising speed-reducing gearing in a gear case 5 carrying a power-input shaft 6 connected by said gearing to a power-output sleeve 7 on which the case is rotatably mounted, said power-input shaft being parallel with and spaced laterally from said sleeve which is closely slip-fitted on the shaft 1 and secured thereto in driving connection therewith by a key 8 (Fig. 2). In Fig. 3, the keyway in said sleeve to receive the key 8 is indicated at 8ª.

As best shown in Fig. 3, the sleeve 7 extends through the opposite walls of the gear case and has removably fitted on its ends collars 9 carrying radially disposed set screws 10 in threaded engagement with said collars but extending loosely through unthreaded holes in the sleeve extensions. Each collar has preferably a pair of set screws arranged at an angular distance apart of about 120 degrees from center to center. By tightening the set screws against the shaft, the end portions of the sleeve 7 are clamped between the shaft and collars, thus fastening the sleeve rigidly to the shaft.

The gear case 5 is held in assembly with the sleeve 7, and against axial displacement relative thereto, as shown in Fig. 3 and hereinafter described. The assembled speed-reducing unit can be easily mounted on the shaft to be driven, in proper position thereon, by slipping the sleeve 7 on said shaft, inserting the driving key 8, and tightening the set screws 10.

The gear case 5 may be considered as rotatably mounted on the shaft 1, since it is so mounted on the sleeve 7 fixed to said shaft; however, the gear case is held against rotative movement as hereinafter described. The speed-reducing gearing in said case may be considered as connecting the power-input shaft 6 to the said shaft to be driven, since the sleeve fixed to said shaft is in effect a hub of the driven gear 15 of said gearing shown in Fig. 3.

Referring to Fig. 3, the speed-reducing gearing shown comprises a pinion 11 on the power-input shaft 6 meshing with a gear 12 on a countershaft 13, and a pinion 14 on said countershaft meshing with a gear 15 on the power-output sleeve 7. The pinions 11 and 14 are shown formed integrally with their respective shafts. A driving key connecting the driven gear 15 to the sleeve 7 is shown at 16, and a driving key connecting the gear 12 to its shaft or axle is shown at 17. The speed reduction obtainable by the described unit will of course depend upon the ratios of pitch diameters of the gears 11 and 12 and of the gears 14 and 15.

The shafts 6 and 13 and the sleeve 7 are mounted in the gear case in antifriction bearings provided in this instance by annular ball-bearing units comprising annular series of balls running in confronting grooves in concentric outer and inner race-rings. The bearings for shafts 6 and 13 are designated in Fig. 3 by the numerals 18 and 19 respectively, and the bearings for the sleeve 7 are designated by the numeral 20. The bearings for each of the elements 6, 13 and 7 are fitted in aligned open-ended bores of thickened portions of opposite walls of the gear case. By reference to Figs. 2 and 3, and remembering that Fig. 3 is a section taken on the angled line 3—3 of Fig. 2, it will be readily understood that the bored wall portions in which the sleeve bearings 20 are mounted are formed in part by the flanges 21, and that the bored wall portions in which the bearings 18 and 19 are mounted are formed in part by the flanges 22 and 23.

The gear case 5, sleeve 7 and bearings therefor are maintained in assembly and against relative axial displacement by the following means: Snap rings 24 engaging in annular grooves in the outer race-rings of the sleeve bearings 20 provide thrust shoulders coacting with the interior sides of the gear case walls. A snap ring 25 engaging in an annular groove in the sleeve 7 provides a thrust shoulder coacting with the inner race-ring of the left hand sleeve bearing 20. Another snap ring 26 holds the driven gear 15 in place to provide a thrust abutment for the inner race-ring of the right hand sleeve bearing. Thus the sleeve bearings, being held from axial displacement in either direction, hold the gear case in proper axial relation to the sleeve.

The power-input shaft 6 is held from axial displacement by its bearings 18, the outer race-rings of which are equipped with snap rings 27 coacting as thrust shoulders with the gear case, while the inner race-rings thereof abut thrust shoulders on said shaft. The countershaft 13 is held against axial displacement in a similar manner. The snap rings associated with the outer race-rings of the bearings 19 are indicated at 28.

The gear case 5 is split transversely of the sleeve 7, its opposite members or half-parts being rigidly connected by bolts 29, with an interposed gasket 30 clamped therebetween. The gear case is sealed around the sleeve 7 by annular seals 31, and around the power-input shaft 6 by a similar seal 32. The case opening opposite the seal 32 is closed by a sealed closure 33 shown as a flanged cap affixed to the gear case by screws 34, a gasket 35 being clamped between said cap and the gear case. The case openings opposite the ends of the countershaft 13 are closed by sealing closures 36 shown as cup-shaped sheet-metal stampings press-fitted in said openings. The gearing may therefore work in oil. It is intended to lubricate by splashing of oil by the gearing from an oil pool in the lower part of the gear case. In the opposite walls of the gear case, passages 37 communicating with the spaces between the sleeve bearings 20 and seals 31 are provided to facilitate splashing of oil to said bearings. To prevent build-up of pressure in the gear case which would cause leakage of oil past the seals, there is provided in the upper part of the case a breather plug 38 closing a filling opening, said plug having a vent passage for escape of heated air from the case.

Reverting to Figs. 1 and 2, the power-input shaft 6, which extends through and beyond the front wall of the gear case, is belt driven from the shaft 39 of a stationarily mounted electric motor 40 shown resting on and fastened to the floor of the room in which the machinery is installed. The belt drive shown comprises a V-belt 41 engaging a driving sheave 42 on the motor shaft and a driven sheave 43 on the power-input shaft 6. A desired speed reduction may be obtained by the belt drive, depending of course upon the ratio of pitch diameters of the driving and driven sheaves. Instead of the single V-belt drive shown, a drive of the multiple V-belt type or a drive of the chain and sprocket type may be substituted as an equivalent.

The gear case 5, being rotatably mounted on the shaft 1 and subjected to a torque tending to revolve it, must be held against rotative movement in an angular position relative to said drive. The angular position on shaft 1 at which the gear case must be held depends upon the arrangement of the belt drive and the length of the driving belt or distance between centers of the driving and driven sheaves. The gear case is held in such position by a so-called torque-arm or rigid link 44 pivotally attached at one end of the gear case and at its opposite end to a fixed anchorage provided in this instance by a bracket 45 fastened to the floor. Said torque-arm may be variously arranged to hold the gear case in different angular positions on shaft 1, to suit various requirements. For example, looking at Fig. 2, it will be apparent that by fastening the floor bracket 45 in a position either to the right or to the left of that shown, the angular position of the gear case on said shaft could be very substantially changed to suit a longer or shorter belt drive or a different arrangement thereof. With a torque-arm arranged as shown and of sufficient length, the gear case could, if necessary, be held at an angle of 90 degrees or even 180 degrees from the position shown. The torque-arm may be arranged to serve either as a strut or a tension bar, according to conditions as to the direction of torque tending to revolve the gear-case and the arrangement of the torque-arm.

One of the bolts 29 connecting the members of the gear case may be utilized as the pivot-pin for the upper end of the torque-arm, as shown in Fig. 5, the bolt 29ª so utilized being sufficiently long for the purpose. During installation, the nut on said bolt is left loose to allow pivoting of the torque-arm relative to the gear case. After installation and adjustment of the gear case to proper position, the nut is screwed up to tighten the bolt, thereby clamping the apertured upper end of the torque-arm between the nut and gear case. If it should be desired to connect the torque-arm to the gear case at a different point from that shown, the relatively long bolt 29ª to furnish a pivot for the torque-arm could be substituted for one of the two other bolts 29 in the lower part of the gear case, while said one of the other bolts could be used where the bolt 29ª is shown. In short, the torque-arm could be attached to the gear case at any of the points indicated by the three bolts connecting the case members at the lower part of the case.

As the power-input shaft 6 and sleeve 7 are in parallel relation, the distance between centers of the driving and driven sheaves 42 and 43 of the belt drive depends upon the angular position at which the gear case 5 is held relative to the shaft 1. Advantage is taken of this condition to provide for easy adjustment of the position of the gear case for utilization thereof as a belt-tightener. For this purpose a variable length torque-arm 44 is employed, said torque-arm comprising oppositely screw-threaded rods 46 and 47 connected by a turn-buckle 48. A jam nut for the turn-buckle is indicated at 49, which must be unscrewed from engagement with the turn-buckle to permit operating the latter. After the machinery is installed and the bracket 45 fastened to the floor, the angular position of the gear case can be easily and quickly adjusted by operating the turn buckle as required for tightening the driving belt or to permit easy replacement thereof by a new belt and tightening the same after installation. The nut on bolt 29a is left loose until after such adjustment.

As shown in Fig. 2, there are provided in the perimeter of the gear case 5, at appropriately angularly spaced intervals, a number of screw plugs including the breather plug 38 and other plugs 50, these plugs being interchangeably usable each in any of the plug holes; so that in any of various angular positions at which the gear case may be held, the breather plug may be positioned in an upper part of the gear case, while one of the other plugs in a lower part of the gear case may be used as a drain plug.

The breather plug 38 shown in Fig. 5 has an inwardly opening chamber 51 and vent passage 52, said chamber being of sufficient diameter to avoid discharge of oil by capillary action. Fixed in the chamber is a stem 53 carrying a baffle 54 to prevent or minimize splashing of oil into the chamber. The baffle 54 may be provided with holes for drip-back of oil from the chamber.

An alternative form of breather plug designated 38a is shown in Fig. 6. In this form of plug, baffle 55 is carried by a stem 56 capable of a limited axial movement to permit momentary closing of the plug by the baffle by splashing of oil against the inner face of the baffle.

In the appended claims the term "belt-drive" is used as a broad term inclusive of a multiple V-belt drive or a chain and sprocket drive, and such terms as "belt" and "belt-driven" are intended to be construed with corresponding breadth.

I claim:

1. A power transmission unit adapted for detchable driving connection with and pendular support on a shaft to be driven, said unit comprising an elongated casing of substantially greater length than width and of relatively shallow depth between spaced apart substantially parallel walls of said casing, said casing being substantially symmetrical about a medial plane extending transversely of said walls in the direction of the elongation of the casing, a power input shaft and an intermediate drive shaft extending between and journaled on said walls with their respective axes parallel to, spaced from and disposed on opposite sides of said medial plane, said input shaft carrying a pinion drivingly connected with a gear on the intermediate shaft, and a power take-off shaft comprising a sleeve carrying a gear thereon in driving engagement with a pinion on the intermediate shaft, said sleeve extending between and being journaled on said spaced walls with its axis lying in said medial plane, the opposite ends of said sleeve projecting outwardly of said spaced walls through alined openings therein, whereby the shaft to be driven may extend through said sleeve and casing and project therefrom at the opposite sides of said casing, fastening means to drivingly connect the sleeve on the shaft to be driven, said sleeve, when mounted on the shaft to be driven, providing therewith a common axis of pendular support about which the unit may be swingably supported, with its center of gravity disposed substantially below said common axis to thereby obtain substantially static balance of the unit about said common axis.

2. A power transmission unit as set forth in claim 1, wherein the fastening means for drivingly securing the sleeve on the shaft to be driven is provided in position to be adjusted outwardly of the casing at each of the opposite outwardly projecting ends of the sleeve.

3. A power transmission unit as set forth in claim 1, wherein the axes of the input and intermediate shafts lie in a common plane substantially normal to said medial plane.

4. A power transmission unit as set forth in claim 1, wherein the axis of the input shaft is spaced from said medial plane a vertical distance appreciably greater than the vertical spacement of the axis of the intermediate shaft from said medial plane.

5. A power transmission unit as set forth in claim 1, wherein the vertical spacement of the axis of the input shaft from the medial plane is less than twice the vertical distance between the medial plane and the axis of the intermediate shaft.

6. A power transmission unit as set forth in claim 1, wherein the ratio of the vertical spacements of the axes of the input and intermediate shafts from the medial plane is substantially as three is to two.

ALEXANDER T. BODLE.

References Cited in the file of this patent

UNITED STATES PATENTS

| Number | Name | Date |
|---|---|---|
| 619,421 | Johnson | Feb. 14, 1899 |
| 1,281,418 | Rathbun | Oct. 15, 1918 |
| 1,921,296 | Harkness | Aug. 8, 1933 |
| 2,054,782 | Day | Sept. 15, 1936 |
| 2,108,367 | Christian | Feb. 15, 1938 |
| 2,116,166 | Christian | May 3, 1938 |
| 2,158,272 | Chilton | May 16, 1939 |
| 2,379,579 | Hunter | July 3, 1945 |
| 2,383,872 | MacPherson | Aug. 28, 1945 |
| 2,475,042 | McCloskey | July 5, 1949 |